INVENTOR:
WILLIAM C. DEE

May 5, 1970  W. C. DEE  3,510,175
FLUID BEARING ASSEMBLY
Filed June 13, 1966  2 Sheets-Sheet 2
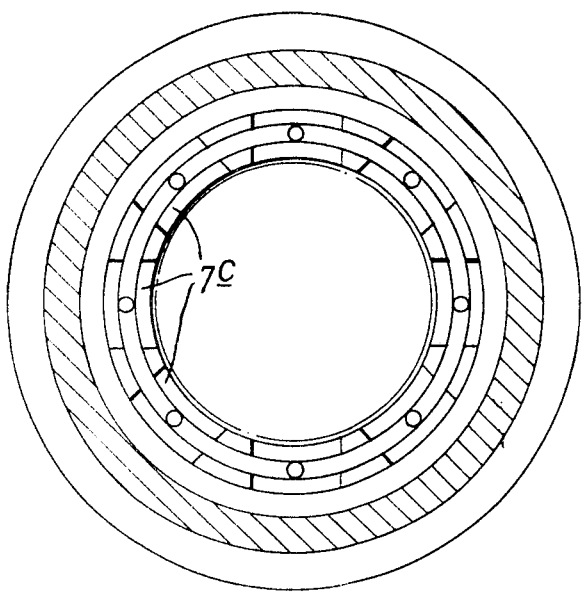
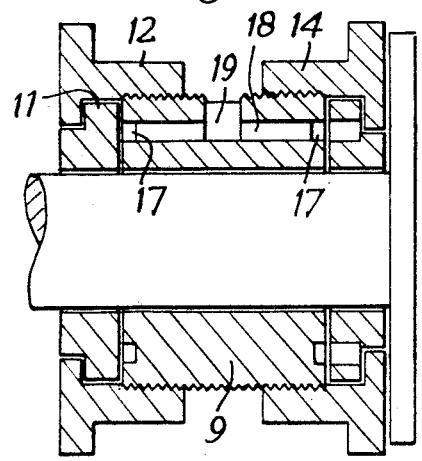
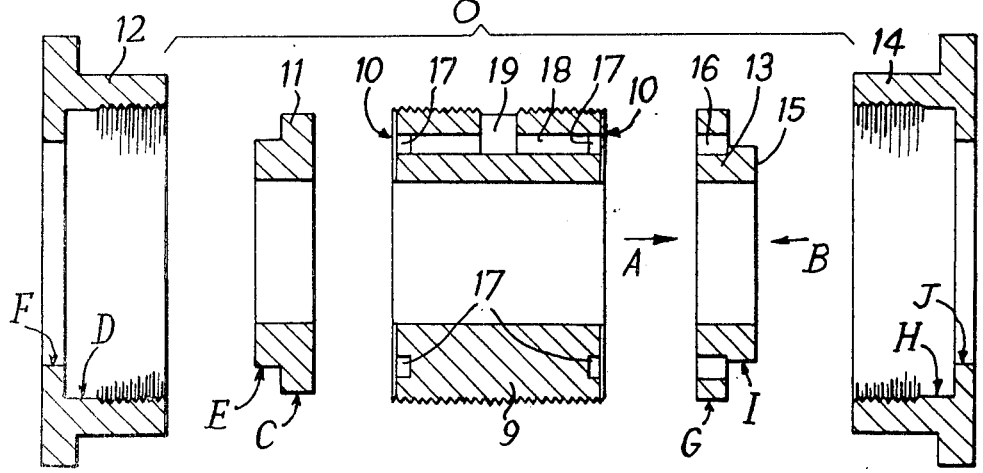
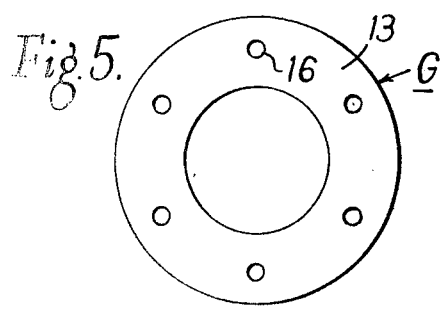
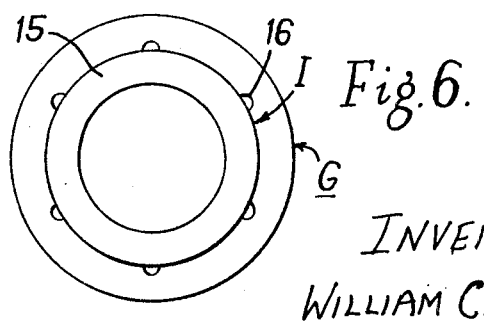
INVENTOR:
WILLIAM C. DEE

United States Patent Office 3,510,175
Patented May 5, 1970

---

3,510,175
FLUID BEARING ASSEMBLY
William C. Dee, Bournemouth, England, assignor to Gilbert C. Davis, Johannesburg, Transvaal, Republic of South Africa
Filed June 13, 1966, Ser. No. 557,231
Claims priority, application Great Britain, June 18, 1965, 25,840/65
Int. Cl. F16c 17/16
U.S. Cl. 308—9                    2 Claims

ABSTRACT OF THE DISCLOSURE

Fluid bearing devices are disclosed in which two or more grooved members are held together at grooved interfaces to form slots feeding bearing fluid to an axial bearing gap. The slots are separated from each other by identical symmetrical spacers and supply fluid to the gaps in a normal direction.

---

Figure 1:
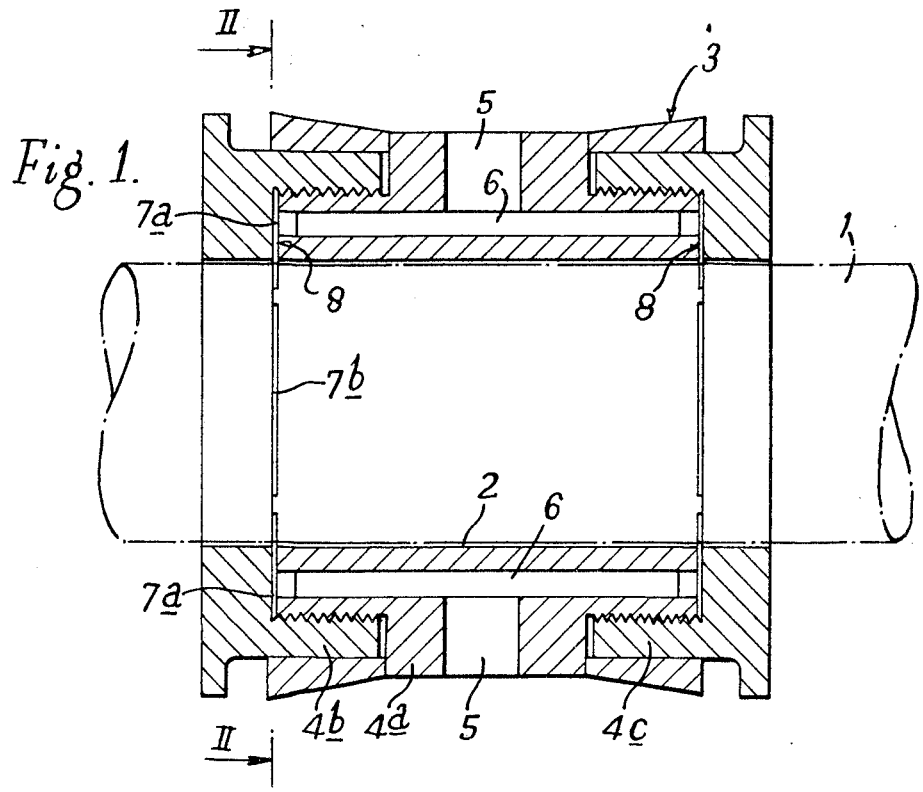

This invention relates to journal gas bearings and to thrust gas bearings of the hydrostatic type, and is concerned with overcoming problems of manufacture of both such bearings, and instabilities encountered in such journal bearings.

In the manufacture of such bearing, one of the main problems hitherto has been the production of the extremely small feed holes in one bearing member for the supply of gas under pressure to the annular bearing gap between the bearing members. Such holes may need to be as small as, for instance, about five thousandths of an inch or less in diameter and in view of the practical difficulties in drilling them it has hitherto been necessary to reduce the thickness of the bearing member to such an extent that its inherent rigidity has been threatened.

Reduction of diameter of the gas feed holes has a direct relation to the resultant "stiffness" of the bearing, and consequently the tendency has been to use smaller diameter feed holes and smaller bearing gaps, both to increase the "stiffness" of the bearing and to conserve the power consumed in pumping gas to the bearing.

It is accordingly a first object of the invention to provide an improvement whereby gas feed holes of comparable flow characteristics to those obtained with drilled holes may be provided by techniques other than drilling and which are much more readily applied in practice with adequate or even greater accuracy.

Another problem which arises with the use of drilled gas feed holes is that, due to the extremely small dimensions and tolerances involved, it is difficult to obtain and to check exactly radial positioning of the axis of the hole in journal bearings. If the axis of the hole lies even slightly tangentially to the axis of rotation, rather than being truly radial, the jet of gas will tend to introduce a rotational torque on the rotor. In some applications, for example in gyroscope bearings, the presence of any extraneous or random torque may affect the accuracy of the instrument.

It is accordingly a second object of the invention to provide an improvement whereby the gas feed holes may be formed in a necessarily truly radial position by techniques which are readily applied in practice in a relatively simple manner.

According to the present invention, in a gas bearing one or more gas feed holes opening into a bearing gap defined between two relatively movable bearing members are constituted by slots defined between a face of each of two elements of one of the bearing members.

For a journal gas bearing, a plurality of holes may each be constituted by a slot defined between a radial face of a first element of the bearing member and an axially-recessed radial face of an abutting second element of that bearing member. In this context "radial" includes the meaning of "possessing a radial component of directions." It is known to be advantageous in a journal bearing if the gas supply is introduced into the bearing gap at a plurality of angularly and preferably symmetrically spaced positions. Accordingly, in such a bearing the second element may have in its radial face a plurality of axial recesses symmetrically angularly disposed about the axis of rotation of the bearing.

In a preferred arrangement, the axial recessing is formed by milling or grinding across an end face of the second element.

It is in practice relatively simple to machine channels in an exposed surface, and also to provide a truly plane surface to abut against the channeled surface. For example, the channels may readily be milled out, and the plane surface may be lapped.

Although the invention is not limited thereto, the abutting surfaces of the first and second elements would, for convenience, be wholly radial surfaces.

Due to the fact that the channels are formed in an exposed surface of the first element, they can also be very accurately aligned in truly radial positions, so that no extraneous rotation torque is exerted on the other bearing member.

A considerable advantage of the present invention is that the formation of the channels on an axially facing surface permits avoidance of the relatively thin sleeves previously necessitated by drilling of gas feed holes. Accordingly, the outer bearing element can be made of greater radial thickness and thus have proportionately greater stiffness under stress.

In order to facilitate the obtaining of an even supply of gas to said slots it is convenient to provide gas supply passage means therefor including a coaxial annular channel opening axially in the axially-recessed radial face of the second element.

In an axial thrust gas bearing, a single annular hole may be used to feed gas to the bearing gap, and such a hole may be constituted by an annular slot defined between an outside diameter of a first element of the bearing member and an inside diameter of a second element of the bearing member. Preferably, such reduction of the outside diameter to provide the radial width of slot desired is carried out by grinding.

Figure 2:
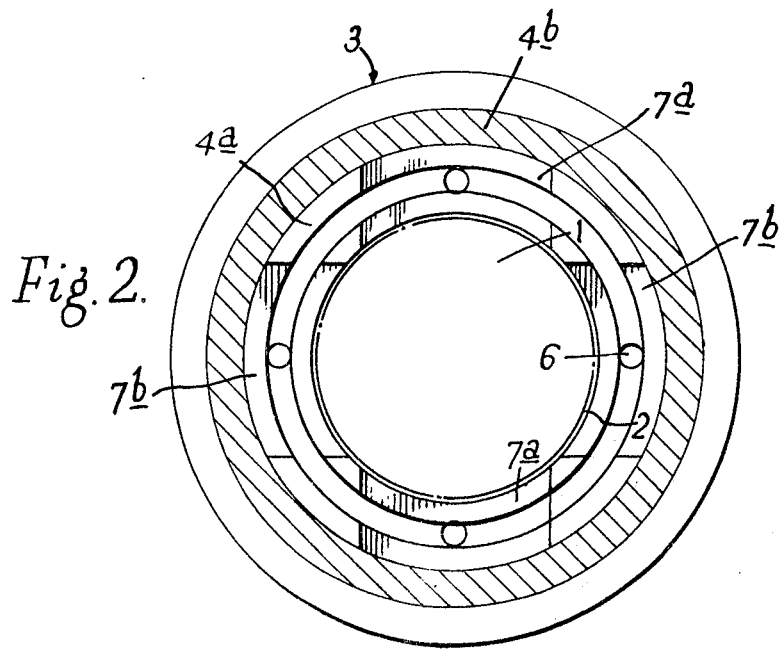

In order that the nature of the invention may be readily ascertained, two embodiments of gas bearing in accordance therewith are hereinafter particularly described by way of non-limiting example with reference to the accompanying drawings, wherein:

FIG. 1 is an axial section of a journal gas bearing;
FIG. 2 is a section taken on the line II—II of FIG. 1;
FIG. 3 is a section, similar to that of FIG. 2, of a modified journal gas bearing;
FIG. 4 is an "exploded" axial section of an axial thrust bearing;
FIG. 5 is a view taken in the direction of the arrow A in FIG. 4;
FIG. 6 is a view taken in the direction of the arrow B in FIG. 4;
FIG. 7 is an axial section of the assembled bearing of FIG. 4.

Referring to FIGS. 1 and 2, a journal gas bearing is constituted by a shaft 1 rotatable with an extremely small clearance 2 within a bearing shell 3 constituted by a sleeve 4a on which are threaded end members 4b and 4c.

The sleeve 4a has radial gas inlet ports 5 leading to gas distribution passages 6 drilled parallel to the axis of the bearing.

The two end faces of the sleeve 4a are milled across symmetrically in two directions at 90° so as to produce recesses 7a and 7b. The inside axial end face 8 of each of the end members 4b and 4c is ground and lapped so as to be very accurately radial and when the two end members are threaded into the position shown they serve to define four radial slots disposed at 90° spacing about the axis.

The gas distribution passages 6 open into these slots and gas under pressure passes through the slots to the bearing clearance 2.

Referring to FIG. 3, the arrangement is similar to that of FIGS. 1 and 2, but the ends of the sleeve are milled across four times at angles of 45° to provide a total of eight channels 7c symmetrically angularly disposed about the axis of the bearing.

Referring to FIGS. 4 to 7, which shows a bearing including also an axial thrust bearing, the bearing outer member comprises a central sleeve 9 which has radial channels 10 milled across each end face, as described above in relation to FIGS. 1 and 2. Against one end of the sleeve 9 there is seated an end element 11 secured in position by a threaded ring 12. Against the other end of the sleeve 9 there is seated an end element 13 secured in position by a threaded ring 14. One end element 11, the diameter C is ground to be a clearance fit within the diameter D, and diameter E is ground to be an accurate fit into diameter F, thereby ensuring that there is no gas leakage from the channels 10 other than radially into the bearing gap. On end element 13, diameter G is ground to be an accurate fit into diameter H, but diameter I is ground smaller than diameter J so as to leave an annular slot clearance of say, .001 to .0015 inch. This annular slot supplies, to the thrust bearing gap 15, compressed gas received through passages 16 communicating with an annular passage 17 supplied through bores 18 from a plurality of radial ports 19.

As an alternative to the screw-threading shown, the rings 12 and 14 could be secured on the sleeve 9 by adhesive.

As an alternative to the bores 18, flats may be milled axially along the outside diameter of the sleeve 9 so as to provide, within the end elements 12 and 14, a series of gas supply passages parallel to the axis and leading from ports 19 to the radial channels 10.

I claim:

1. A fluid bearing assembly comprising first and second bearing members relatively rotatable about an axis of rotation and serving to define between them a fluid bearing gap, one of said bearing members including first and second elements and means locking said first and second elements in assembly stationarily one with respect to the other, said first element having a plane radial face, said second element having a radial face into which there is formed a plurality of parallel sided shallow recesses the depth dimension of which is parallel to the bearing gap, separated by identical symmetrical spacers, and said recesses and spacers having their respective longitudinal median lines disposed at equally angularly spaced intervals symmetrically about the bearing gap, said plurality of recesses extending longitudinally as far as the bearing gap, said plane radial face of said first element being butted against said recessed radial face of said second element thereby to define a plurality of constructionally symmetrical recesses open at an end normal to the bearing gap, preventing other than normal radial fluid passage, and wherein the sum of the respective circumferential widths of the said open end of the plurality of recesses is a major fraction of the circumference of the bearing gap at its periphery, said one bearing member including passage means for feeding bearing fluid to the bearing gap.

2. A fluid bearing assembly comprising first and second bearing members relatively rotatable about an axis of rotation and serving to define between them a fluid bearing gap, one of said bearing members including at least one intermediate element and end elements disposed one at each end of said intermediate element and means locking said intermediate element and said end elements in assembly stationarily each with respect to the others, at least one of said elements having a plane radial face butted against another element having a radial face in which there are provided a plurality of parallel-sided shallow recesses the depth dimension of which is parallel to the bearing gap and the longitudinal median line of which is radial to the bearing gap, separated by identical symmetrical spacers, and said recesses and spacers having their respective longitudinal median lines disposed at equally angularly spaced intervals symmetrically about the bearing gap, said plurality of recesses extending longitudinally as far as the bearing gap and open at one end normal to the bearing gap, preventing other than normal radial fluid passage, and wherein the sum of the respective circumferential widths of the said open end of the plurality of recesses is a major fraction of the circumference of the bearing gap at its periphery, said one bearing member including passage means for feeding bearing fluid to the bearing gap.

References Cited

UNITED STATES PATENTS 3,368,850   2/1968   Wilcox _____ 308—9

MARTIN P. SCHWADRON, Primary Examiner

F. SUSKO, Assistant Examiner